United States Patent [19]

Smillie

[11] Patent Number: 4,494,318
[45] Date of Patent: Jan. 22, 1985

[54] APPARATUS AND METHOD FOR MANUFACTURING CURED RESIN-COATED PARTICLES FOR USE AS A PROPPANT

[75] Inventor: John G. Smillie, Aurora, Ill.

[73] Assignee: Aurora Industries, Inc., Montgomery, Ill.

[21] Appl. No.: 499,369

[22] Filed: May 31, 1983

[51] Int. Cl.³ ............................................ D06F 58/00
[52] U.S. Cl. ....................................... 34/112; 118/60; 427/221; 427/385.5; 432/228; 165/90; 165/91; 34/120
[58] Field of Search ............................ 118/60, 20, 642; 432/60, 228, 246; 34/112, 120; 165/90, 91; 427/221, 385.5

[56] References Cited

U.S. PATENT DOCUMENTS

| | | |
|---|---|---|
| 2,823,753 | 12/1958 | Henderson et al. |
| 2,965,514 | 12/1960 | Less et al. |
| 2,967,789 | 1/1961 | Hoyt et al. |
| 2,993,871 | 6/1961 | Shannon et al. |
| 3,081,269 | 3/1963 | Shannon et al. |
| 3,193,011 | 7/1965 | Rickard |
| 3,274,046 | 9/1966 | Shannon et al. |
| 3,632,537 | 1/1972 | Paleologo et al. |
| 3,929,191 | 12/1975 | Graham et al. |
| 4,016,931 | 4/1977 | Cryar, Jr. |
| 4,068,718 | 1/1978 | Cooke, Jr. |
| 4,074,760 | 2/1978 | Copeland et al. |
| 4,090,995 | 5/1978 | Smillie et al. |
| 4,113,916 | 12/1978 | Craig |
| 4,196,114 | 4/1980 | Funabiki et al. |
| 4,206,262 | 6/1980 | Craig |
| 4,216,829 | 8/1980 | Murphey |
| 4,221,829 | 9/1980 | Vargiu et al. |
| 4,238,523 | 12/1980 | Porter et al. ......................... 427/4 |

OTHER PUBLICATIONS

Underdown and Das, "New Proppant for Deep Hydraulic Fracturing"; May 19-11, 1982.
"Synthetic Resins and Allied Plastics"; 3rd Ed., Oxford U. Press, 1951, pp. 16-17 and 131-133.
C. E. Cooke, Jr., "Conductivity of Fracture Proppants in Multiple Layers"; Journal of Petroleum Technology, Sep. 1973, pp. 1101-1107.

Primary Examiner—Michael R. Lusignan
Assistant Examiner—Ken Jaconetty
Attorney, Agent, or Firm—Leydig, Voit, Osann, Mayer & Holt, Ltd.

[57] ABSTRACT

In accordance with the invention an apparatus and method are provided for curing resin-coated particles on a heated rotating surface. A single layer coating of uncured resin-coated particles is fed to the heated rotating surface. As the surface continues to rotate the uncured resin-coated particles become tacky and adhere to the rotating surface. The tack adhesion prevents the pull of gravity from separating the particles from the surface as rotation continues. Proper curing of the particles occurs on the heated rotating surface before one complete revolution is made by the surface. Cured particles are removed by a stationary scraper blade edge which rides the rotating surface and wedges between the adhering particles and the surface as the surface rotates past the edge.

12 Claims, 4 Drawing Figures

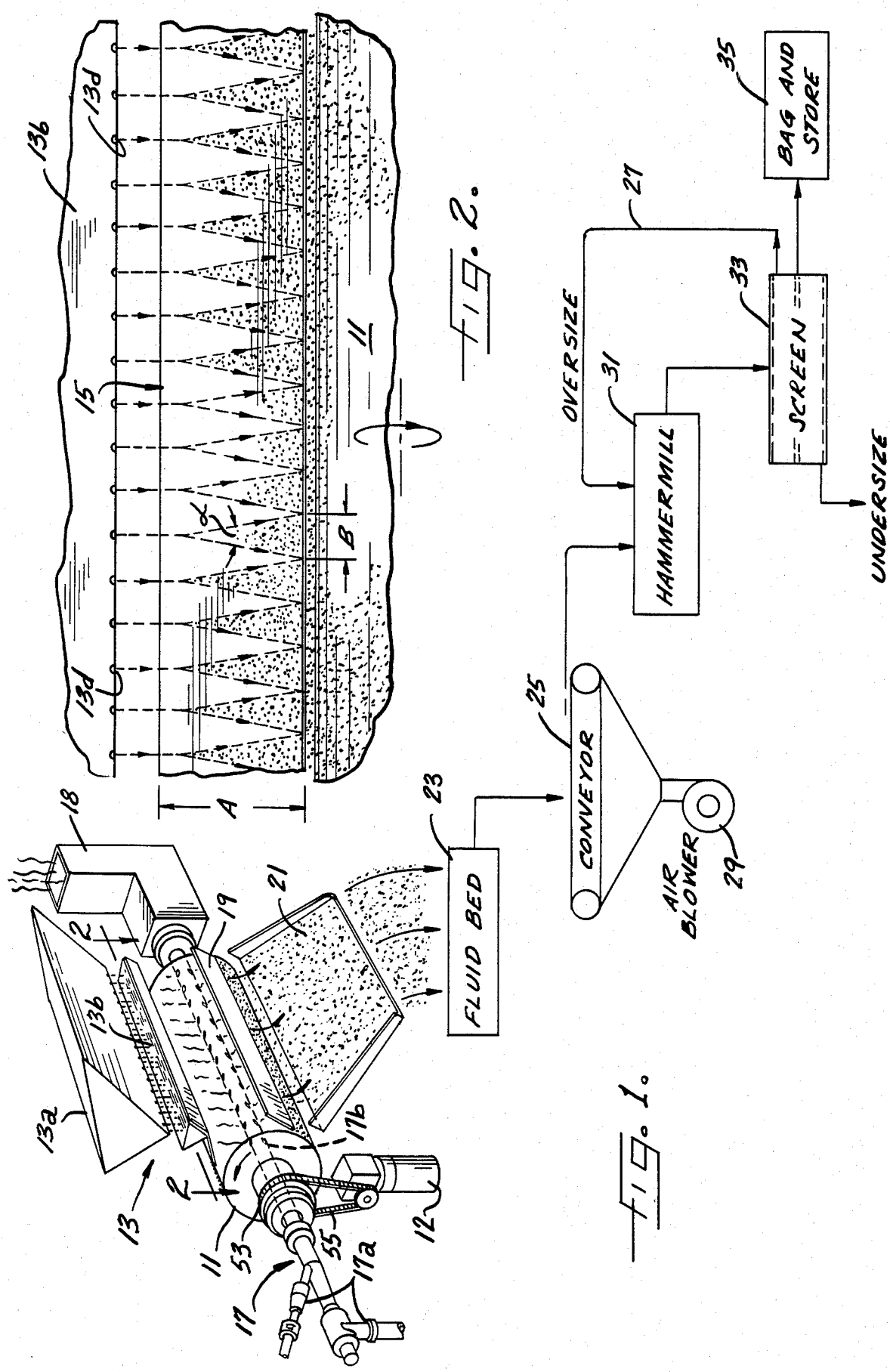

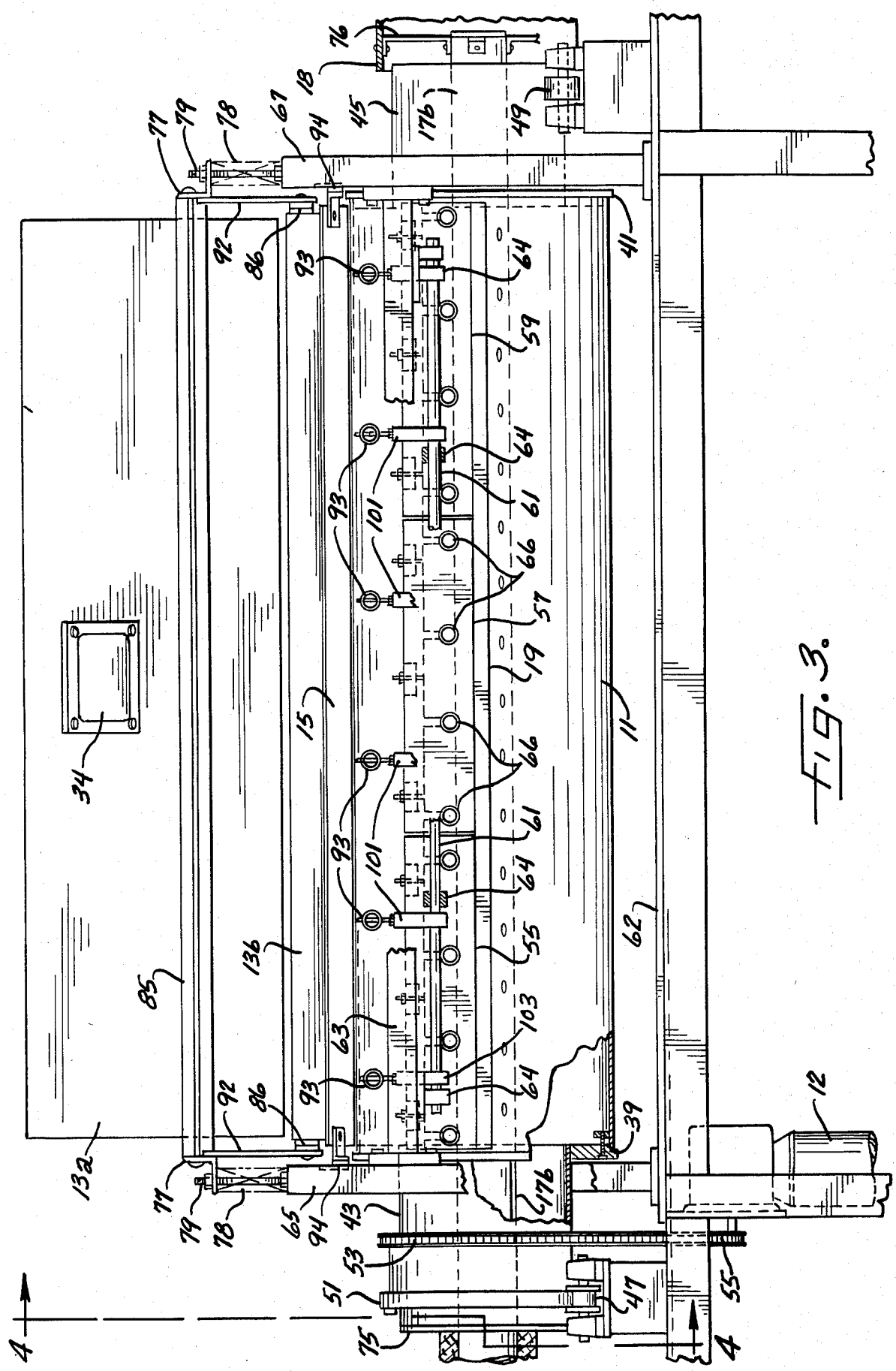

APPARATUS AND METHOD FOR MANUFACTURING CURED RESIN-COATED PARTICLES FOR USE AS A PROPPANT

BACKGROUND

The present invention relates generally to a method and apparatus for curing resin-coated particles of sand and, more particularly, to a method and apparatus for forming a proppant comprising sand grains which are individually coated with a cured thermoset resin.

Resin-coated silica sand particles have well known uses as shell molds and cores in the foundry art. One process of preparing phenolformaldehyde resin-coated shell sand is described in U.S. Pat. No. 4,090,995 to Smillie. These resin-coated sand particles are cured when they are formed into shell molds and cores. Recently it has been discovered that pre-cured resin-coated sand particles (particularly phenolformaldehyde resin-coated) have great utility as a propping agent in oil wells, gas wells, water wells and other similar boreholes. Previously, uncured resin-coated sand has been introduced into boreholes for use as a proppant; for example, U.S. Pat. No. 3,929,191 to Graham et al. describes a proppant which is cured in the borehole by borehole temperature and pressure. When properly cured, resin-coated silica sand particles cured before being introduced into the borehole have been shown to give good performance as a propping agent up to about 10,000 p.s.i. In particular, sand particles coated with cured phenolformaldehyde resin have proven particularly useful.

SUMMARY OF THE INVENTION

It is a primary object of the present invention to provide an improved method and apparatus for controllably curing thermosetting resin-coated particles. It is a related object of the invention to provide such a method and apparatus which consumes a relatively small work area and is economically advantageous to operate.

A further object of the invention is to provide an apparatus which has very little down time requirements and can feasibly be operated on a 24 hour basis.

Another object of the invention is to provide cured thermosetting resin-coated particles which have a low level of cross-binding between particles.

Still another object of the invention is to provide cured thermosetting resin particles which have an acceptably low level of surface roughness.

Other objects and advantages of the invention will be apparent from the following detailed description.

In accordance with the invention an apparatus and method are provided for curing resin-coated particles on a heated rotating surface. A single layer coating of uncured resin-coated particles is fed to the heated rotating surface. As the surface continues to rotate the uncured resin-coated particles become tacky and adhere to the rotating surface. The tacky adhesion prevents the pull of gravity from separating the particles from the surface as rotation continues. Proper curing of the particles occurs on the heated rotating surface before one complete revolution is made by the surface. Cured particles are removed by a stationary scraper blade edge which rides the rotating surface and wedges between the adhering particles and the surface as the surface rotates past the edge.

BRIEF DESCRIPTION OF THE DRAWINGS

In the drawings:

FIG. 1 is a perspective view of the apparatus according to the invention and the system utilizing the apparatus.

FIG. 2 is a planar view of the deflector plate utilized in the apparatus according to the invention;

FIG. 3 is a full back view of the apparatus according to the invention; and

Figure 4:
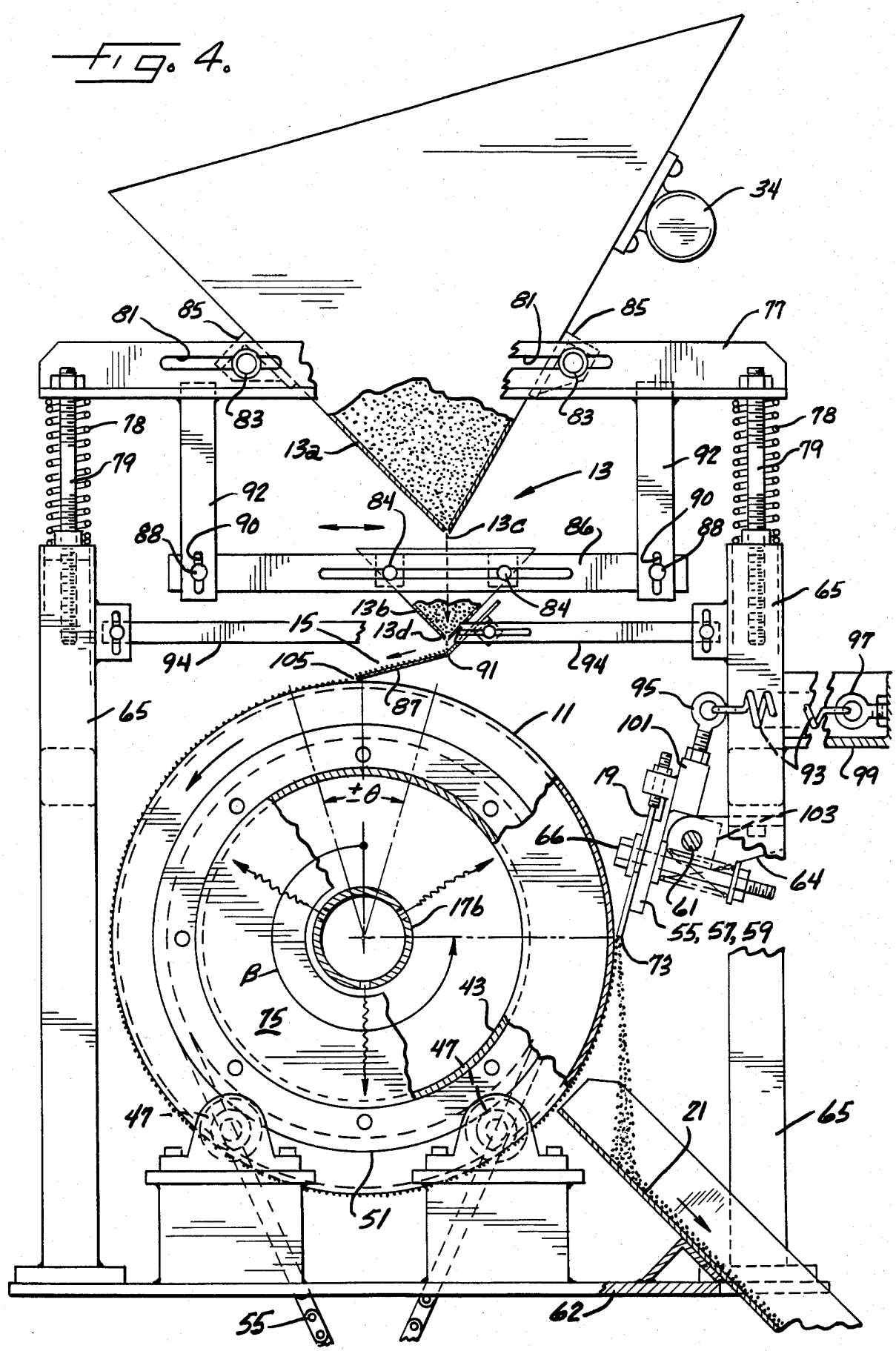
FIG. 4 is a cross-sectional side view of the apparatus according to the invention taken along the line 4—4 in FIG. 3 and in the direction of the arrows.

Although the invention will be described in connection with certain preferred embodiments, it will be understood that it is not intended to limit the invention to those particular embodiments. On the contrary, it is intended to cover all alternatives, modifications and equivalents that may be included within the spirit and scope of the invention as defined by the appended claims.

DESCRIPTION OF THE PREFERRED EMBODIMENT

FIG. 1 shows a perspective view of the apparatus according to the invention together with a block diagram of the system utilizing the apparatus. Arrows indicate the movement of the resin-coated particles through the system. Curing of the resin-coated particles occurs on the rotating surface of a cylinder 11. Rotation of the cylinder 11 is powered by a motor and gearbox assembly 12. Power is transferred from the motor and gearbox assembly to the rotating cylinder by way of chain 55. As the cylinder rotates, resin-coated particles, which are held in a hopper 13, are fed to the cylinder surface by way of round holes located at equidistant intervals along the bottom or vertex of the hopper 13. For reasons that will be explained in connection with FIG. 4, the hopper 13 is divided into a first chamber 13a and a second chamber 13b. Both hoppers are vibrated to reduce the possibility of clogging at the hopper feed holes.

Diffusion of the particles on the surface of a deflector plate 15 results from the deflector plate intercepting discrete streams of particles from the holes in the bottom of the hopper at an angle less than perpendicular to the flow of the stream. After the particles hit the deflector plate they roll or slide down an incline defined by the deflector plate surface. As the particles roll or slide along this deflection path, the particles are dispersed across the length of the deflector plate. When the resin-coated particles reach the edge of the deflector 15 they are fully dispersed and they fall onto the heated rotating cylinder 11 in a single layer pattern which is uniform across the entire length of the cylinder 11.

When heat is applied to particles coated with an uncured thermosetting resin, the resin first softens and becomes tacky. Simultaneously, the applied heat stimulates the chemical reaction which results in the polymerization or curing of the resin. Polymerization hardens the resin before the melting point of the uncured resin is reached. The amount of polymerization or curing of a resin is controlled by the amount of heat applied to the resin. As the polymerization of the resin progresses, the resin becomes increasingly rigid.

In order to ensure the particles have sufficient time to become tacky and adhere to the cylinder surface, the edge of the deflector 15 is positioned near the zenith of rotation of the cylinder 11. To provide for an even distribution of particles along the length of the cylinder, the edge of the deflector plate 15 is straight and parallel to the axis of rotation of the rotating cylinder 11. A more detailed description of the function of the deflector plate is given in connection with FIG. 2.

To provide the heat necessary for the curing of the resin, the surface of the rotating cylinder 11 is heated to a temperature between about 200° and about 600° F. The exact temperature is dependent on the r.p.m. of the rotating cylinder and the degree of curing required, as will become clear from the discussion below. Preferably the surface of the rotating cylinder 11 is heated by a heater 17 at least partially located inside the cylinder 11. The heater 17 is a gas device with a combustion chamber and fan 17a located external to one open end of the cylinder 11. An exhaust manifold 17b delivers the hot fumes into the interior of the cylinder where the heat is transferred to the cylinder walls. A conventional exhaust vent 18 is located at the opposite open end of the cylinder, for removing the fumes from the interior of the cylinder 11 and directing them safely away. An alternative to an external combustion chamber for the heater 17 is for combustion to occur inside the cylinder and within the manifold, although this direct fire approach may result in uneven heat distribution when used in large cylinders. In both heating approaches, the surface temperature of the cylinder 11 can be controlled by any conventional thermostatic control system. Preferably the system includes a temperature sensor located in the exhaust vent and a solenoid, responsive to the sensor, for controlling the rate of gas flow into the combustion chamber.

In accordance with one important aspect of the invention, a continuous single layer stream of uncured resin-coated particles is distributed over the surface of the heated rotating cylinder close to the zenith of the cylinder rotation. As the cylinder continues to rotate, the resin becomes tacky, causing the particles to adhere to the surface of the cylinder. The tacky adherence of the particles prevents the force of gravity from separating the particles from the cylinder surface as it rotates. Before one cylinder rotation is completed the resin is properly cured and removed from the cylinder. To effect a single layer distribution on the cylinder surface the deflector plate intercepts the stream of particles from the hopper and disperses the stream into a single layer flow at the deflector plate edge. The resin-coated particles must have time to sufficiently soften and adhere to the cylinder 11, before the rotation of the cylinder 11 brings the particles to a point where, were it not for the tacky adherence of the particles, ordinary frictional forces would be overcome by gravity and the particles would fall off the cylinder. If the particles are sufficiently tacky at this point in the rotation of the cylinder 11, then the particles will stay on the cylinder and cure or polymerize as the cylinder continues to rotate. Consequently, precise location of the deflector plate edge relative to the cylinder zenith is necessary.

Once at rest on the cylinder surface, a particle will not slide on the surface of the rotating cylinder until the force component of gravity which is tangential to the surface of the rotating cylinder, overcomes the frictional force between the cylinder and the particle. To prevent the particles from falling off the cylinder when the tangential component of the gravitational force overcomes the frictional force, the tacky bonding which occurs between the heated cylinder surface and the softened resin-coated particles must occur before the frictional force is overcome. By proper combination of rate of rotation (r.p.m.), cylinder diameter and cylinder surface temperature, the tacky adhesion caused by the resin melting onto the cylinder surface summed with the frictional force is always greater than the gravitational force tangential to the cylinder surface. Consequently, the resin-coated particles are carried on the rotating cylinder through the nadir of the cylinder's rotation. More importantly, the curing particles are sufficiently adhered to the rotating cylinder so that when the tangential component of gravity reaches 100% of the full pull of gravity (i.e., at 90° from the cylinder zenith), the particles do not separate from the cylinder. The tacky bonding, resulting from the initial softening of the particles, holds the particles to the surface of the rotating cylinder, thus allowing the heat at the cylinder surface sufficient time to cure the resin-coated particles.

In accordance with another important aspect of the invention, satisfactory curing of the resin-coated particles must occur in less than the time of one revolution of the cylinder since the rotating cylinder is continuously receiving a single layer stream of uncured resin on its surface. If the temperature of the cylinder surface is too high, the resin-coated particles will soften too much before polymerization begins to harden the resin coating. The result would be a cured resin coated particle having a pronounced flat portion (where the particle adhered to the cylinder) that would be undesirable for use of the cured particles as a proppant. Therefore, the rate of rotation of the cylinder, the diameter of the cylinder and the temperature of the cylinder surface must be adjusted so their interaction results in proper resin softening for adhesion and proper curing in less than one cylinder revolution. A particular dimensional example is given in connection with FIG. 4.

Still referring to FIG. 1, to remove the cured resin-coated particles from the rotating cylinder, a scraper blade 19 is located proximate to the cylinder at a point past the nadir of the cylinder rotation. The edge of the blade rests on the cylinder surface and acts as a wedge to separate the cured resin-coated particles from the rotating cylinder. The rotating cylinder 11 continues to rotate at a constant r.p.m. such that the portion of the cylinder surface, which carried the now released resin particles, continues toward the zenith of cylinder rotation and receives more resin particles to begin another rotation of melting, curing and scraping. After the scraper blade 19 has released the cured resin-coated particles from the rotating cylinder 11, a chute 21 catches the falling particles and direct them to a fluid-bed cooler 23 for cooling the heated particles. The fluid-bed cooler also helps to remove a slight static charge carried by the cured resin-coated particles which causes some clustering of the particles.

From the fluid-bed cooler 23 the partially cooled particles are picked up by a conveyor belt 25 which delivers the cured particles to a conventional hammermill 31. The conveyor belt 25 finishes cooling the particles by exposing the particles to the ambient air or by forcing air over the particles by way of an air blower and vent 29 shown in FIG. 1.

In the hammermill 31, the particles are vigorously mixed to ensure each particle is free of other particles and, therefore, no multiple particle grains exist. From the hammermill the particles are delivered to a screen 33 where the particles are screened once more. Then the correctly sized particles are removed from screen 33 and are stored or bagged by well known conventional means 35. Oversized particles are delivered back to the hammermill 31, by some conventional means shown symbolically by arrow 27, for further mixing and particle separation.

When the resin is properly cured, cooled, mixed and screened, the resulting particles are free flowing and suitable for use as a proppant. Because the method of manufacturing the cured resin-coated particles requires only a few mechanical movements, the apparatus which implements the curing method according to the invention can be run 24 hours a day without a shutdown period for repair or maintenance. As a complement to this, the method of curing is relatively free of by-product build-up so that the apparatus can be run for long periods without requiring a shutdown for cleaning.

FIG. 2 is a planar view of the deflector plate 15 in FIG. 1. The impact of the particles from the feed holes 13d of the hopper second chamber 13b onto the deflector plate 15 tends to disperse the particles over the surface of the deflector plate. If the plane of the deflector plate surface were perpendicular to the discrete streams of particles flowing from the hopper, the dispersion of the particles would be even over 360° about the point of impact for each discrete stream. By adjusting the plane of the deflector plate away from horizontal, the dispersion of the particles becomes less than 360°. In fact, the dispersion angle is inversely proportional to the angle of the deflector plate 15 since an increase of the deflector plate angle causes a decrease in the dispersion angle of the impacting stream. The angle of the deflector plate must be sufficient to insure the dispersion angle is less than 180° in order that all the particles find their way to the deflector plate edge.

A further consideration for the deflector plate is the length A of the spillway of the deflector plate 15. The spillway is that portion of the deflector plate between the particle impact area and the edge of the plate. The length of the spillway A must be sufficient to insure the width of the particle distribution at the deflector plate edge (shown as B in FIG. 2), is such that there is only a single grain layer of particles. Preferably, two adjacent discrete particle streams have associated dispersing particle paths along the deflector plate spillway that meet at the deflector plate edge but do not overlap. By such an arrangement, the particles fall onto the rotating cylinder in an even distribution across the cylinder.

From the above discussion it can be seen that if the feed rate of the hopper 13 is adjusted (by increasing or decreasing the diameter of the holes 13d in the vertex of the hopper), the deflector plate must also be adjusted. The dispersion angle $\alpha$ and the distance A and B must be such for the new feed rate so that the particles reach the edge of the deflector plate 15 and fall onto the rotating cylinder 11 in a single grain level, evenly distributed across the length of the rotating cylinder.

FIG. 3 shows a full back view of the apparatus according to the invention. The rotating cylinder 11 has two end plate mountings 39 and 41 which form an annular connection between the rotating cylinder 11 and cylinder sections 43 and 45 respectively. For rotational support of the cylinder 11, the two cylinder sections 43 and 45 rest on support rollers 47 and 49. In order to prevent undesired movement of the rotating cylinder 11 along its axis of rotation, a securing ring 51 is fitted over the cylinder section 43. Support roller 47 has a central groove which receives the securing ring 51 in a tongue and groove arrangement. To provide a drive mechanism for the cylinder 11, a sprocket 53 is fitted over the cylinder section 43. Rotation of the cylinder 11 is controlled by a motor and gear box assembly 12 which transfers its energy by way of chain 55 to the rotational movement of the cylinder 11.

As the rotating cylinder 11 rotates freely about its axis of rotation, the edge 73 of the scraper blade 19 rides the surface of the cylinder. To provide a mounting support for scraper blade 19, three panels 55, 57 and 59 are secured to a horizontal rod 61. In turn, rod 61 is secured to a cross beam 63 by way of a series of holders 64 with annular holes. Cross beam 63 is connected with end frames 65 and 67. A base 62 secures frame 65, 67 in a fixed position. To secure the scraper blade 19 onto the panels 55, 57 and 59, each panel has four spring-loaded bolts 66 associated with it. Blade adjustment on the surface of the panels is provided as three groups of four slots 68 in scraper blade 19 which receive the spring-loaded bolts. The slots and bolts allow for vertical adjustment of the scraper blade 19. For precise alignment of the scraper blade, adjustable set screws 69 are provided which lie in the same plane defined by the planar surface of the scraper blade 19 and panels 55, 57 and 59.

Threaded bores which receive the set screws are integral with the panels 55, 57 and 59. Each panel 55, 57 and 59 has two set screws (one at each end of the panel) associated with it. One end of each of the set screws butts up against the edge 71 of the scraper blade opposite the blade edge in contact with the rotating cylinder. Precise positioning of the scraper blade is achieved by butting the blade against the set screws and adjusting the set screws to achieve precise positioning of the blade and then tightening bolts 66 to secure the scraper blade 19 to the fixed panels 55, 57 and 59.

A simple metal gasket 75 is provided between the rotating cylinder section 43 and the exhaust manifold 17b. The gasket is constructed of a metal plate with an annular opening having a diameter slightly larger than the cross-sectional diameter of the exhaust manifold 17b. This allows a small clearance gap between the stationary manifold and the gasket which rotates with the cylinder. Because the exhaust end of the cylinder has a much larger open area than the area of the gap, there are only small amounts of fumes from the combusted gas which escapes through the gap. A conventional labyrinth air seal can be added to the gasket 75 and manifold 17b for the purpose of sealing off the gap so even small amounts of fumes will not escape. Preferably the manifold 17b extends beyond the entire length of the cylinder 11 and the two adjoining cylinder portions 43, 45 so that the manifold can be supported at both ends instead of being cantilevered. To provide the support for manifold 17b at its closed end, the manifold closed end extends beyond the open end of cylinder portion 45 to a support piece 76. Of course, the other end of the manifold 17b is supported by the fan and combustion chamber 17a. To minimize heat loss outside of the cylinder, an insulating material is coated over that portion of the manifold 17b outside of the rotating structure of cylinder 11, cylinder portion 43 and gasket 75.

Satisfactory uniform heating of the cylinder surface is provided by even spacing of holes on a cylindrical manifold with each row located 120° from the other two. The perforating holes are located in three straight line rows along manifold 17b. For uniform heating of the cylinder surface in a direct fire heater, the hole distribution should not be even. Rather the pattern should be spread such that more holes are located toward the end of the manifold. In accordance with well known practice to maintain exhaust pressure at the last hole in the manifold, it is necessary to restrict the total area of the holes to less than the cross-sectional areas of the manifold 17b.

FIG. 4 is a side partial cross-sectional view of the rotating cylinder 11 and associated mechanisms taken along the line 4—4 in FIG. 3 and in the direction of the arrows. As mentioned earlier, hopper 13 is a dual hopper arrangement comprising two chambers, 13a and 13b, for holding the uncured resin-coated particles. Each chamber is triangular in shape with an open top and a row of perforating holes, 13c and 13d respectively, at the bottom vertex of each chamber. Uncured resin-coated particles are funneled through chamber 13a of the hopper into chamber 13b where the particles are again funneled through to the spillway area 87 of the deflector plate 15. By dividing the hopper 13 into two chambers the larger chamber 13a, which holds the uncured resin-coated particles for the majority of time, can be placed at a vertical distance from the rotating cylinder 11 which is sufficient to insure the radiant heat from the cylinder surface has dissipated to a point not to cause the particles to cure while in chamber 13a.

Since the chamber 13a is much greater in volume than the chamber 13b, the total time spent in the hopper 13 is largely the time spent in chamber 13a. Therefore, the total hopper throughput time for a particle is largely made up of time spent in chamber 13a. Since curing is controlled by time and temperature, the greater distance chamber 13a is from the heat of the rotating cylinder, the longer the throughput time can safely be without causing premature curing of the resin-coated particles. Accordingly, the dual hopper allows a large supply of resin-coated particles to be held (in chamber 13a) while simultaneously delivering the particles to the cylinder surface without requiring a large vertical drop from the hopper holes (from chamber 13b) which could result in many particles bouncing off the cylinder surface before they could adhere to the surface. Because of the dual hopper construction there is no need to cool the hopper surface since the throughput time in the second chamber 13b is sufficiently small so that the higher temperature of the second chamber surface will not cause premature curing of the resin-coated particles.

Chambers 13a and 13b are supported in place by cross beam 77. Both chambers can be adjusted to a variable height above the top of the rotating cylinder 11 through adjustment of threaded bolts 79 in bore holes at the top of frame supports 65. Horizontal adjustment for chamber 13a is provided by slots 81 in cross beam 77 which hold bolts 83. Bracket pieces 85 and bolts 83 secure the hopper chamber 13a to the cross beam 77. Bracket pieces 85 are welded to two sides of the first chamber 13a and receive the bolts 83 at the elbow of the bracket.

Second chamber 13b of the hopper also has a mechanism for horizontal adjustment and a mechanism for vertical adjustment. Beam 86 supports the second chamber 13b of the hopper in its appropriate horizontal and vertical position. Beam 86 is, in turn, supported by cross beam 77 by way of vertical straps 92. Horizontal adjustment is provided by a slot, bolt and bracket arrangement 84 in cooperation with beam 86 which is substantially similar to that used for chamber 13a. Vertical adjustment for chamber 13b is provided by a slot and bolt combination. This combination consists of bolts 88 fitted into slots 90 of vertical straps 92 of the frame supports 65.

The deflector plate 15 achieves support by being attached to cross beam 94. The spillway area 87 of the deflector plate is attached to a support area 89 of the deflector plate by way of elbow 91. Slot and bolt assemblies allow the vertical and horizontal position of the deflector plate to be adjusted.

To provide a mechanism to vibrate the hopper chambers 13a and 13b, an electrical or pneumatic vibrator 34 is directly mounted to the hopper. Any number of different mounting arrangements for the vibrator may be used which function to vibrate the particles held in the two hopper chambers. Coil springs 78 isolate the vibration of the hopper from the remainder of the apparatus. The springs 78 fit over the bolts 79 and span the gap between the end frames 65 and the cross beam 77.

The resin-coated particles travel on the surface of the cylinder 11 in the direction indicated by the arrow in FIG. 4. When the resin-coated particles have reached the correct degree of curing, the particles are forced off the cylinder by scraper blade 19. Blade edge 73 rides against the cylinder surface at the point in cylinder rotation where proper curing has been reached. Since what constitutes proper curing depends on the intended use of the particles, it should be noted that although FIG. 4 shows the edge 73 of the scraper blade 19 at approximately 270° of rotation, the edge 73 can be placed wherever the point of proper curing occurs. After the cured particles are wedged off the surface of the cylinder 11, they fall onto chute 21 and slide or roll to a point of further processing in accordance with the processing shown in FIG. 1.

Biasing of the edge 73 of the scraper blade 19 against the surface of the cylinder 11 is accomplished by a spring 93. Each end of the spring 93 is anchored to a ring-head bolt 95, 97. An L-shaped support bracket 99 is welded to frame supports 65 and 67. Ring-head bolt 97 is secured in a bore hole on the vertical wall section of L-shaped support bracket 99. Ring-head bolt 95 mates with threaded bore piece 101 which is welded to one of the three panels 55, 57 or 59. Pivot piece 103 provides a welding surface for the panels 55, 57 and 59 and the threaded bore piece 101 for ring-head bolts 95. As can be seen in FIG. 3, pivot piece 103 is repeated six times along the length of the cylinder as also is the biasing mechanism of the ring-head bolts 95, 97 and spring 93. Each of the pivot pieces 103 have an annular hole which allows the welded assembly to fit over rod 61 and pivot about the rod axis. Therefore, through a lever action about pivot piece 103, the spring 93 holds the edge 73 of scraper blade 19 in biased engagement with the surface of cylinder 11. As mentioned in connection with FIG. 3, spring loaded bolts 66 hold the scraper blade 19 against the panels 55, 57 and 59.

To insure that the uncured particles adhere properly to the rotating cylinders, and to insure that the deflector plate 15 does not become overheated, the position of the deflector edge 105 is of primary importance. The vertical placement of the edge 105 is the controlling dimension which prevents unacceptable heat build-up on the deflector plate 15. A bolt and slot arrangement in the cross beam 94 allows the beam and deflector plate 15 to be moved vertically. If the vertical distance is too short, the deflector plate will heat up sufficiently to cause tacky adhesion of the particles to the spillway, which can result in clogging of the feed mechanism. On the other hand, if the vertical distance is too great, the kinetic energy of the falling particles can cause the particles to bounce off the cylinder surface.

To obtain proper adhesion of the particles to the rotating surface the deflector edge 105 can be adjusted by moving it along a horizontal displacement defined by the bolt and slot arrangement 96. If the deflector edge 105 is moved too far to the right of the origin, uncured resin-coated particles falling to the cylinder surface will roll off the back of the cylinder since the initial angle of the surface when the particles hit is too steep to allow the particles to become tacky and adhere. Similarly if the deflector edge 105 is too far to the left in FIG. 4, the particles will roll off the front of the cylinder 11. The angle $\pm\theta$ (measured from a vertical axis passing through the cylinder zenith and its cross-sectional center) describes the surface region of the cylinder surface, when stationary, over which the particles can be safely dropped. In this region, frictional forces can work to hold the particles in place for a sufficient amount of time until the tacky adhesion of the softening particles has a chance to occur.

A portion of the angular momentum of the rotating cylinder is imparted to the particles as they hit the surface of the cylinder. Because of this the limit of the horizontal displacement of the deflector plate edge 105 is slightly greater to the right of the cylinder zenith in FIG. 4 than to the left. Therefore there is a small angle $\Delta\theta$ (not shown in FIG. 4) directly related to the momentum of the rotating cylinder which is added to the angle $\theta$ to the right of the zenith and substracted from the angle $\theta$ to the left of the zenith. Ordinarily this angle $\Delta\theta$ is much smaller than the angle $\theta$ and is not a major consideration in adjusting the horizontal position of the deflector edge.

Cured resin-coated particles are scraped off the cylinder surface at some point in a full 360° revolution of the cylinder. That radial point is represented by the angle $\beta$ in FIG. 4 (measured from the same vertical axis as angle $\theta$). Precise placement of the scraper blade 19 allows precise control of the curing of the resin-coated particles. Since the rate of rotation of the cylinder and the surface temperature of the cylinders are kept constant, once the radial point of proper curing is determined and the scraper edge 73 is positioned, the manufacture of consistently properly cured resin-coated particles is assured.

As an example of a possible production model of the invention, the cylinder may be 18 inches in diameter and have a 5½ feet axial length. Between ten or eleven revolutions per minute is the preferred range for the rate of rotation. For proper curing the surface temperature should be between 450°-600° F. depending on the type of resin being cured. A four inch diameter manifold is used with evely spaced holes in three rows located 120° from each other. Even heat distribution over the length of the cylinder (within ±5°) is provided by the manifold. To insure correct placement of the particles onto the rotating cylinder surface, the deflector plate edge 105 should be approximately +⅛ inch above the cylinder zenith (vertical placement) and +½ inch to the right (as viewed in FIG. 4) of the vertical axis. For proper curing of the resin-coated particles as a proppant, the scraper blade edge 73 touches the surface of the rotating cylinder at approximately the $\beta$ angle of 270°. The exact magnitude of the angle $\beta$ depends on the exact surface temperature of the cylinder 11 and the surrounding ambient conditions of the cylinder. The cylinder 11 is preferably made of carbon steel, while the scaper blade 19 is preferably made of stainless steel.

It will be appreciated from the foregoing discussion that the apparatus according to the invention utilizes a heated rotating surface to cure resin-coated particles and that the tacky adhesive quality of the curing particles is utilized to hold the particles to the rotating surface. Further, it will also be appreciated from the foregoing discussion that the two chamber hopper offers protection from premature curing of the resin-coated particles by minimizing the time of storage of the particles in close proximity to the heated rotating surface.

We claim as our invention:

1. An apparatus for curing resin-coated particles comprising:

a rotating surface for receiving uncured resin-coated particles on the rotating surface, a feed mechanism which routes controlled amounts of the uncured resin-coated particles to said rotating surface in a manner to effect a single layer distribution of the particles, means for softening and curing the resin-coated particles to the desired extent in less than one revolution by said rotating surface, a drive mechanism for rotating said surface about its axis at a rotational velocity such as to cause the softening and curing resin-coated particles to adhere to said rotating surface at a point in the rotation of said surface where the force of gravity would otherwise cause the particles to separate from the rotating surface, and means for removing the resin-coated particles adhering to said rotating surface when the resin-coated particles are properly cured.

2. An apparatus for curing resin-coated particles as set forth in claim 1 wherein said means for removing includes a scraper having an edge parallel to the axis of said rotating surface with said edge being in such close proximity to said rotating surface as to cause the cured resin-coated particles adhering to said rotating surface to be scraped from said surface.

3. An apparatus for curing resin-coated particles as set forth in claim 1 wherein said feed mechanism includes;

a hopper having first and second chambers for cascading the resin-coated particles from said first chamber to said second chamber to said feed mechanism, said second chamber being closer to said rotating surface and exposed to greater intensity radiant heat than said first chamber and said second chamber having a greater throughput time for a particular resin-coated particle than said first chamber, whereby said first chamber with a slower throughput is kept sufficiently distant from said rotating surface to prevent heat build-up in said first chamber, which would cause premature curing of the resin-coated particles.

4. An apparatus for curing resin-coated particles as set forth in claim 3 wherein said feed mechanism includes a deflector plate which intercepts the uncured resin-coated particles released from said second chamber and evenly disperses the resin-coated particles across the deflector plate, the edge of said deflector plate releasing the evenly dispersed resin-coated particles onto the surface of said rotating surface in a single layer.

5. An apparatus for curing resin-coated particles as set forth in claim 4 wherein the edge of said deflector plate is positioned parallel to the axis of rotation of the rotating surface and proximate to the zenith of the surface's rotation.

6. An apparatus for curing resin-coated particles as set forth in claim 1 wherein said feed mechanism routes measured amounts of the uncured resin-coated particles to said rotating surface near the zenith of the surface rotation.

7. An apparatus for curing resin-coated particles as set forth in claim 4 wherein the vertical distance between the rotational zenith of said rotating surface and the edge of said deflector plate is sufficient so that said deflector plate will not retain excessive heat from the radiant heat off the rotating surface so as to cause the resin-coated particles to soften and adhere to said deflector plate.

8. An apparatus for curing resin-coated particles as set forth in claim 1 wherein said means for softening and curing the resin-coated particles includes a heater for heating said rotating surface.

9. An apparatus for curing resin-coated particles as set forth in claim 1 wherein said feed mechanism includes a feed rate control which adjusts the flow rate of the resin-coated particles such that the amount of double layering of the resin-coated particles is minimized.

10. An apparatus for curing resin-coated particles as set forth in claim 8 wherein said heater comprises a manifold located interior of said rotating surface and positioned along the length of the surface's axis of rotation, said manifold distributing hot gases to the interior of said surface for the purpose of heating the cylinder surface.

11. An apparatus for curing resin-coated particles as set forth in claim 8 wherein said heater comprises a heat radiator positioned outside the rotating surface at a radial distance measured from the axis of said rotating surface which is greater than the largest radial distance of said rotating surface as measured from the axis of said rotating surface.

12. An apparatus for curing resin-coated particles as set forth in claim 11 wherein said heater is a microwave radiator.

* * * * *